United States Patent [19]
Otto et al.

[11] Patent Number: 5,954,848
[45] Date of Patent: Sep. 21, 1999

[54] FILTER CARTRIDGE AND METHOD FOR ITS MANUFACTURE

[75] Inventors: Rainer Otto, Darmstadt; Hans Wiegand, Fürth, both of Germany

[73] Assignee: Firma Carl Freudenberg, Weinheim, Germany

[21] Appl. No.: 09/139,826

[22] Filed: Aug. 25, 1998

[30] Foreign Application Priority Data

Sep. 4, 1997 [DE] Germany ............... 197 38 178

[51] Int. Cl.⁶ ............................................. B01D 46/52
[52] U.S. Cl. ..................... 55/385.3; 55/497; 55/502; 55/511; 55/521; 55/529
[58] Field of Search ........................... 55/385.3, 521, 55/529, 497, 498, 502, 511

[56] References Cited

U.S. PATENT DOCUMENTS

| | | | |
|---|---|---|---|
| 4,746,432 | 5/1988 | Taki et al. ............................... | 55/529 |
| 5,128,039 | 7/1992 | Gabrielson ............................... | 55/521 |
| 5,522,909 | 6/1996 | Haggard ................................... | 55/521 |
| 5,632,793 | 5/1997 | Haggard ................................... | 55/521 |
| 5,792,228 | 8/1998 | Fath et al. ............................... | 55/521 |
| 5,814,117 | 9/1998 | Mochida ................................... | 55/521 |

FOREIGN PATENT DOCUMENTS 44 27 817  2/1996  Germany .

*Primary Examiner*—Jay H. Woo
*Assistant Examiner*—Minh-Chau T. Pham
*Attorney, Agent, or Firm*—Kenyon & Kenyon

[57] ABSTRACT

A filter cartridge having pleated filter material, the ends of which are joined together to form a conical tube. At least one band is bonded to the pleated filter material and extends at least partially around the circumference of the material in the area of each of its end sides. The band may be bonded to crease points of the filter material. A method of manufacturing the filter cartridge includes providing the initially strip-shaped, planar filter material with pleats. The pleated strip-shaped filter material is laid out forming an unwound cone-shaped shell. A band is placed onto the crease points of one side and is bonded to the crease points. Subsequently, the filter material is bent to form a conical tube, and the tube is closed upon itself by joining the two ends together.

8 Claims, 2 Drawing Sheets

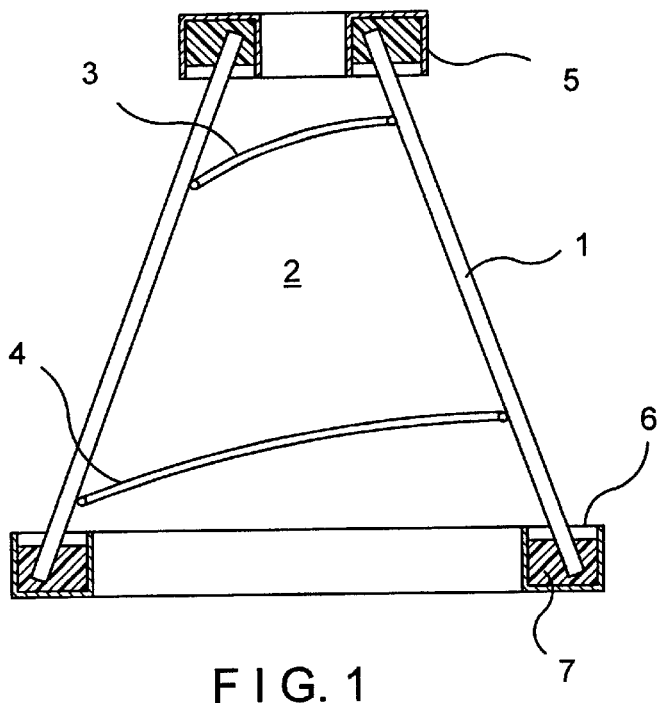
F I G. 1
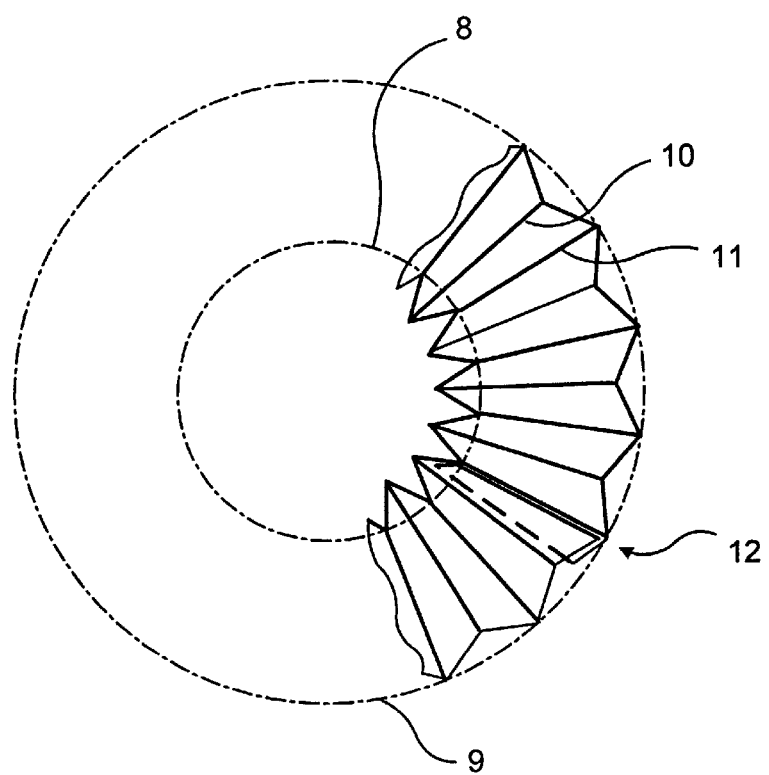
F I G. 2

FILTER CARTRIDGE AND METHOD FOR ITS MANUFACTURE

FIELD OF THE INVENTION

The present invention relates to filtration, and in particular to a filter cartridge for filtration of liquids and gases.

BACKGROUND INFORMATION

Filter cartridges are used for cleaning or purifying gases or liquids. In this context, the fluid loaded with particles to be separated out flows against the wall of the filter cartridge, which is permeable only by the fluid. As the medium, forced by a pressure difference, passes through the wall of the filter cartridge, the particles are separated out and the fluid exits, cleaned, on the other side of the wall.

German Patent No. 44 27 817 A1 describes a filter cartridge which includes a cylindrical filter pad. The pad is made of a layered nonwoven fabric and pleated parallel to its axis. During filter operation, the filter receives flow-through radially toward the interior space, so that the clean-gas (downstream) side is situated in the interior of the cylinder. Manufacturing this filter cartridge takes place such that a strip of filter nonwoven fabric is first pleated and then conveyed into a cylindrical shape, the ends of the strip being bonded to each other. In the area of the two end sides, the resulting tube is glued, dust tight, to a plastic cover or base.

Conical filter cartridges also are used in various filter systems, with glass fiber paper often being used as a filter medium. In this context, the design is similar to that of the cylindrical filter cartridge. Conical shapes are relatively complicated compared to cylindrical shapes, however, and therefore present difficulties in the formation of a conical tube.

SUMMARY OF THE INVENTION

According to the present invention, a conical pleated tube has at least one band, in each case, running at least partially around the circumference of the tube in the area of the end sides, the band being joined, on one side of the pleated filter material, to the filter material in the area of the crease points.

The band preferably extends in the circumferential direction into the vicinity of a filter material point of connection, which is disposed in the longitudinal direction of the filter cartridge. In this way, the area of the filter material that is bonded to the band is as large as possible and the stability of the filter material is increased when a conical tube is formed.

Because the band is arranged on the downstream (clean-gas) side of the filter cartridge, it is not exposed to the influence of the particles which are to be filtered out. However, it is also possible in principle to mount the band on the upstream side, in order, for example, to improve a filter cartridge's resistance to blow-out.

It is preferred to bond the band to the filter material crease points using a fusion adhesive. In this way, the band, coated with fusion adhesive, can be pressed onto the filter material, which is laid out flat. When the fusion adhesive hardens, a solid bond is created.

Since there is no need for the band to be placed down along a circular arc, a simpler manufacturing process is possible, the band, bonded to the filter material, may describe a path which clearly deviates from a concentric circle.

The band can be laid down in a straight path onto the filter material, which is laid out flat. When the filter material is bent into a conical tube, the band in this case may have ends with differing angles of incline.

In the method of the present invention for manufacturing a filter cartridge as described above, the initially strip-shaped, planar filter material is furnished, in a pleating device, with essentially parallel pleats; the pleated, strip-shaped filter material is laid out to form an unwound cone-shaped shell; a band is laid down onto the crease points of one side and is bonded to them; subsequently, the filter material is bent into a conical tube; and the filter material is closed upon itself, by joining the two ends together.

Using this method, it is possible to use pleated, straight webs of filter material, which are more elongated on one longitudinal side than on the other longitudinal side, in order to produce a conical filter cartridge. There is thus no need to use already arc-shaped segments for producing a conical filter cartridge.

Particularly as a result of the fact that the band is placed in a straight line onto the filter material, which is laid out forming an unwound cone-shaped shell, and is bonded to the filter material, a dimensionally stable conical shape can be achieved without great expense.

BRIEF DESCRIPTION OF THE DRAWINGS

FIG. 1 is a cross-sectional view of a filter cartridge according to the present invention having a conical tube made of filter material.

FIG. 2 is a top view of the filter cartridge according to FIG. 1.

DETAILED DESCRIPTION

Figure 3:
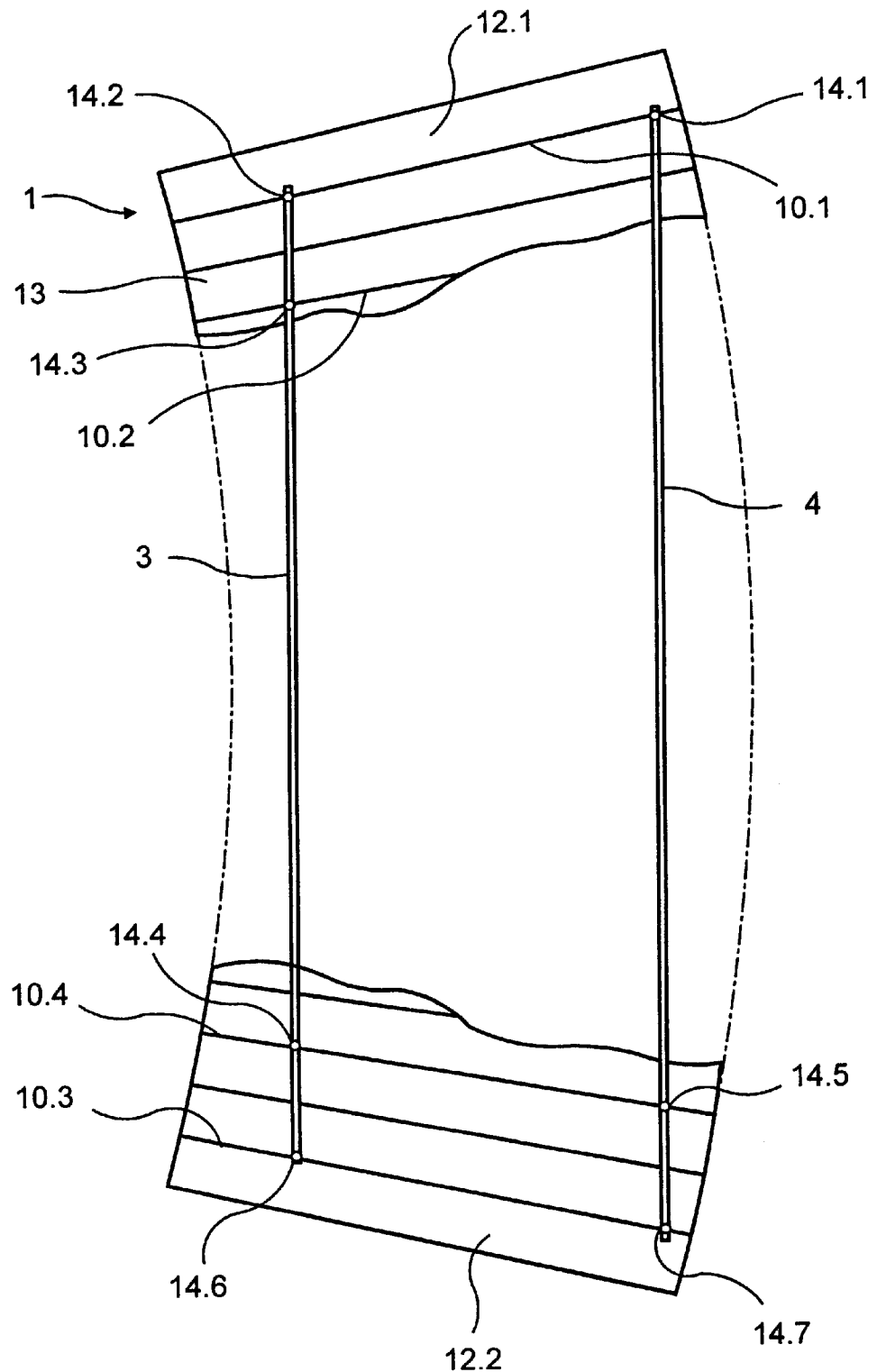
FIG. 3 is a view of filter material according to the present invention in a flat condition before the formation of the tube.

The filter cartridge depicted in FIG. 1 in longitudinal section has the shape of the species of conical or tapered tube. The shell of the tube is made of filter material 1, to which are bonded, in the tube interior 2, two bands 3 and 4, running essentially in the circumferential direction.

In the area of the two end sides of the tube, filter material 1 is bonded dust-tight, to a cover 5 and base 6, respectively, made of, for example, plastic or metal. The bonding may take place by partially filling cover 5 and base 6, respectively, with a liquid synthetic resin 7, for example polyurethane, into which the end of filter material 1, in tube shape, is then dipped or set. When the synthetic resin hardens, a solid bond is created.

Additionally, in tube interior 2, a conical support mesh or support lattice (not shown) can be arranged, which prevents filter material 1 from folding in along the shell under the influence of the pressure difference from the service-gas upstream side to the downstream side, which is situated in tube interior 2, and which also produces a general stabilization during assembly.

In FIG. 2, the top view of the filter cartridge according to FIG. 1 is shown in detail. Filter material 1 extends radially to the outside from an upper end having a relatively small circumference 8 down to the opposite end of the tube, having a relatively large circumference 9.

Filter material 1 is pleated and has, alternatingly, inner and outer crease points 10 and 11. At a point of connection 12, the joint faces of the filter material overlap between an inner and an outer crease point 10 and 11, and they are sealingly bonded to each other. In this way, a closed cone-shaped shell is formed from originally planar filter material 1.

In the exemplary embodiment depicted, the spacing between an inner and an outer crease point 10,11 is constant across the entire height. Due to the widening of the individual pleats formed from a sequence of three consecutive crease points, in the area of large circumference 9 as opposed to small circumference 8, the depth of the pleats, i.e., the radial distance between an inner and an outer crease point 10 and 11, decreases. In contrast, the distance in the circumferential direction between an inner and an outer crease point 10 and 11, increases.

In principle, it is possible that the distance in the circumferential direction remains constant. For this purpose, however, the filter material must be furnished, already in the pleat formation process, with an increasing pleat depth, which is technically expensive. Then, after the formation of pleats, the filter material is already in a curved shape, for example, as a circular arc.

In FIG. 3, filter material 1 is shown in flat condition, before the formation of the tube. The filter material lies flat in the shape of a curved strip corresponding to the flat unwinding of the cone-shaped shell of the finished filter cartridge. Pleats 13 of the originally straight strip have an identical pleat depth and an identical pleat spacing, and therefore correspond to the strip used for the production of a cylindrical filter cartridge.

Bands 3,4 are placed onto the upper side of the curved strip made of pleated filter material 1, the side being situated, for example, in the finished filter cartridge in the tube interior. In this context, bands 3,4 simply rest, in each case, on crease points 10.1–10.4, and are bonded to them by glue points 14.1–14.7.

Bands 3 and 4 are laid straight onto the curved strip, which results in bands 3 and 4 not forming concentric circles when the conical tube is formed. The path of bands 3 and 4 qualitatively corresponds to the path shown in FIG. 1, bands 3 and 4, bonded to filter material 1, which is bent into a conical tube, having ends with differing angles of incline.

These filter cartridges are manufactured such that a straight strip of the filter material is first pleated. The resulting essentially parallel pleats possess an identical pleat depth and an identical pleat distance.

The pleated, strip-shaped filter material is subsequently laid out to form an unwound cone-shaped shell. Two bands 3,4 are placed onto crease points 10.1–10.4 of the one side and are bonded to crease points 10.1–10.4 by glue points 14.1–14.7. Then filter material 1 is bent into a conical tube and is closed upon itself by joining the two ends 12.1,12.2.

Because of glued bands 3,4, when ends 12.1,12.2 of the strip are joined together, the conical shape is already predetermined in size, although only the upper limit of the size of the tube is determined. Compression into a smaller tube is still possible.

Production of the conical tube made of filter material is thus simple to carry out, particularly when band 3,4 is laid in a straight line onto filter material 1, which is laid out in the form of an unwound cone-shaped shell, and is bonded to filter material 1.

The filter cartridges of the present invention are particularly applicable in air purification.

What is claimed is:

1. A filter cartridge having an upstream side and a downstream side, comprising:

a pleated filter material having ends, the ends being joined together to form a conical tube; and a pair of bands extending around at least a portion of a circumference of the tube, each of the pair of bands being disposed in the vicinity of a respective one of upper and lower ends of the conical tube, the bands being bonded to the filter material at crease points.

2. The filter cartridge according to claim 1, wherein the filter material is joined together along a longitudinal connection line and each of the bands is at least partly disposed near the connection line.

3. The filter cartridge according to claim 1, wherein each of the bands is arranged on a downstream side of the filter cartridge.

4. The filter cartridge according to claim 1, wherein the band is bonded to the crease points using a fusion adhesive.

5. The filter cartridge according to claim 1, wherein when the filter material is joined together, each band describes a path which significantly deviates from a concentric circle.

6. The filter cartridge according to claim 1, wherein each band has ends with differing angles of incline.

7. A method for manufacturing a filter cartridge, the method comprising:

pleating a strip of planar filter material;

laying out the strip to form an unwound cone-shaped shell;

placing a band onto crease points of the strip;

bonding the band to the strip at the crease points;

bending the strip to form a conical tube; and joining ends of the strip together.

8. The method according to claim 7, wherein the step of placing the band includes placing the band in a straight line.

* * * * *